Dec. 29, 1964 M. SEUROT 3,163,778

MONOSTABLE TRANSISTORIZED TRIGGER CIRCUIT

Filed June 18, 1962

INVENTOR
*MAX SEUROT*

BY Frank R. Jifani
AGENT

United States Patent Office 3,163,778

Patented Dec. 29, 1964

3,163,778
MONOSTABLE TRANSISTORIZED TRIGGER CIRCUIT

Max Seurot, Carrieres-sous-Bois, France, assignor to North American Philips Company Inc., New York, N.Y., a corporation of Delaware Filed June 18, 1962, Ser. No. 203,264
Claims priority, application France July 12, 1961
3 Claims. (Cl. 307—88.5)

Trigger circuits are often used for producing periodic signals (multivibrators) or trigger signals (triggers) of, at least theoretically, rectangular waveform. If such trigger circuits are equipped with two transistors one of which is conducting only in the rest condition and the other of which is conducting only during operation, the leading or ascending edges of the output signals are steeper, as is well-known, and thus have a shorter duration than the trailing or descending edges, which extend over a longer duration. This is attributable to the storage of charge carriers, notably in the zone of the base, during the conducting period of that transistor which is conducting during the operating phase of the trigger circuit.

If such trigger circuits furthermore have capacitive connections (for example monostable multivibrators or trigger circuits) the longer trailing edge of the signals becomes especially manifest due to the time required for discharging the capacitors.

In a monostable trigger circuit this drawback is particularly annoying because the minimum repetition time interval of the control signals may be too long since it must also include the discharging period of the capacitor which determines the duration of the pulses produced. The connection between the second and first transistors in this type of trigger circuits usually has a purely ohmic character.

In order to mitigate this disadvantage, it is known, for example from U.S. Patent No. 2,898,478, to shunt the collector resistor of the first transistor by a diode connected in the blocking direction with respect to the collector current. If the second transistor is cut off, the capacitor can discharge only through the base resistor of the second transistor, so that the time of recuperation is only reduced by said step but not substantially eliminated. According to U.S. Patent No. 2,827,574, the time of recuperation is substantially eliminated by shunting the capacitor by the emitter-collector path of a transistor having a conductivity type opposite to that of the transistors of the trigger. In this specification, a resistor is included, in series with the capacitor, between the collector of the second transistor and the base of the first transistor of the trigger, the base-emitter control voltage for the third transistor being taken across said resistor.

It is often objectionable to have to use transistors of different kinds and especially of opposite conductivity types in one and the same circuit. Furthermore, the presence of a resistor in the regenerative feedback circuit of a trigger circuit is often undesirable since the slope of the leading edge of the pulses produced may thus be reduced.

An object of the present invention is to provide another solution of the problem of eliminating the time of recuperation which underlies the above cited patents, by using a third transistor of the same conductivity type as that of the transistors of the trigger and no resistor connected in series with the capacitor for controlling the third transistor.

A monostable trigger circuit according to the invention is thus characterized in that the third transistor is of the same conductivity type as that of the first and second transistors, the collector of the third transistor being connected to the collector of the first transistor and its emitter being connected to the base of the second transistor, and the base of the third transistor is connected to a point of constant potential.

The base of the transistor is preferably connected to the point of constant potential through a resistor and the base of the second transistor is connected to the same point of constant potential through another resistor.

Since the first transistor is conducting in the rest condition the capacitor is then discharged and no appreciable voltage exists between the collector and emitter of the third transistor, its base being substantially at the same potential as its emitter.

Due to the presence of the third transistor the capacitor discharges through a resistance of very small value, and hence very rapidly, since it is in practice almost short-circuited, while the charging thereof, which takes place during the working period of the trigger, is substantially not influenced by the third transistor which is at that time cut off. The control pulses initiating each operating period of the trigger may thus follow one another at arbitrary time intervals.

In order that the invention may be readily carried into effect, it will now be described in detail, by way of example, with reference to the accompanying diagrammatic drawing, in which.

Figure 1:
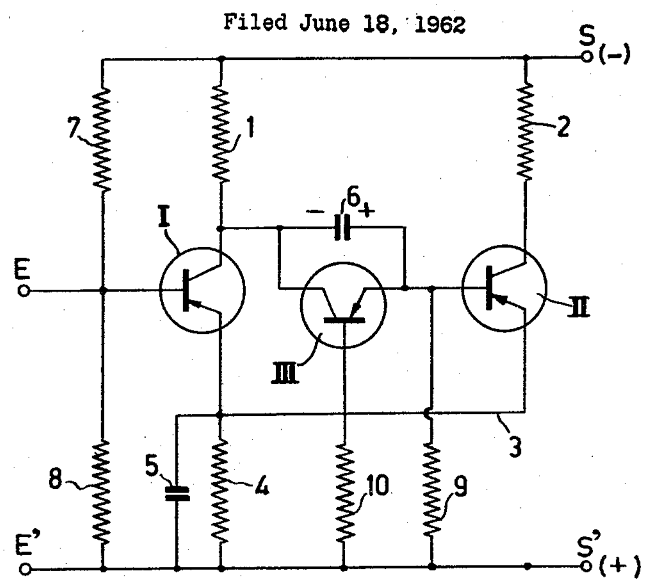
FIG. 1 shows the circuit diagram of one embodiment of the monostable trigger circuit according to the invention.

The most important elements of the monostable trigger circuit of FIG. 1 are: a first transistor I, which is biased so as to be conducting in the rest condition, and a second transistor II, which is cut off in the rest condition. Both transistors are used in so-called grounded-emitter connection. They have separate and preferably identical load resistors 1 and 2 respectively, their emitters being connected through a connection 3 to the positive terminal of the supply source via a single resistor 4 which is shunted by a capacitor 5. This capacitor may be dispensed with, if desired. The connection 3 constitutes the purely ohmic connection which ensures the action of transistor II upon transistor I. The "mutual" connection, that is to say that between transistor I and transistor II, is established by means of a capacitor 6 of suitable capacitance. Each transistor is controlled at its base. That of the first transistor is biased in the rest condition by a voltage divider comprising resistors 7 and 8, so as to render it conducting, whereas that of the second transistor is biased by way of a resistor 9 included between the base and the positive terminal.

The control signals are applied, via an input terminal E of the trigger circuit, to the base of transistor I, thus causing it to be cut off; the voltage drop which existed across its load resistor 1 thus suddenly ceases. The common point between said resistor and the negative electrode of capacitor 6 suddenly becomes more strongly negative, so that said capacitor is charged and the base of transistor II is brought to a potential rendering it conducting.

The conduction of transistor II is thus determined by the charging current of capacitor 6, the duration thereof thus being bound to the charging period of said capacitor whereupon the whole circuit flips over again to the initial or rest condition. From FIG. 2, which shows the charging circuit of said capacitor, it may be seen that this duration is substantially determined by the time constant of the RC circuit, wherein R represents the value of the resistors 1 and 9 in series and C the capacitance of capacitor 6. (In practice the value of resistor 1 is low, for example one tenth of that of resistor 9.) For certain uses of the monostable trigger circuit, it is important that a control signal can again be applied thereto as soon as it has returned to its rest condition, wherein transistor I is conducting and transistor II cut off. This result is obtained due to the fact that, after transistor II has been cut off, capacitor 6 can discharge almost instantaneously through transistor III.

Figures 2, 3:
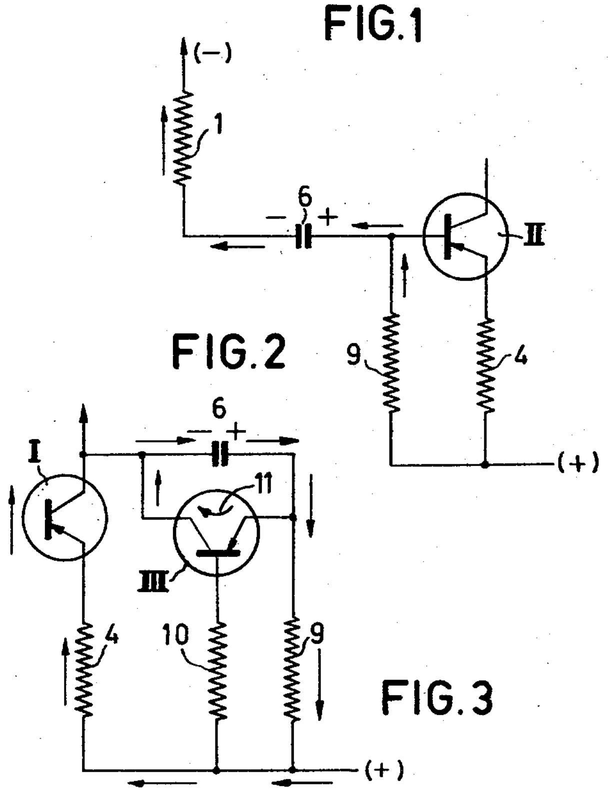
FIG. 2 shows the theoretical charging circuit of the capacitor included between the first and second transistors of the trigger circuit of FIG. 1.
FIG. 3 shows theoretical discharging circuit of the capacitor of the same trigger circuit.

During the recuperation period preceding the actual period of rest, transistor III is actually rendered conducting (in the direction indicated by arrow 11 in FIG. 3, which is the direction of the discharging current). This result is thus automatically obtained without having to derive any base current from elsewhere. In fact, it is the voltage across capacitor 6 itself during the discharge which produces the base current of transistor III required for bottoming or saturating its collector, whereby said capacitor is in practice temporarily short-circuited. The discharging circuit of capacitor 6 is shown n FIG. 3.

It will be evident that it is immaterial whether transistors of the npn-type or the pnp-type are used, provided the polarities of the supply source and of the control signals are chosen correspondingly.

What is claimed is:

1. A monostable trigger circuit having a first transistor and a second transistor of the same conductivity type and a capacitor included between the collector of the first transistor and the base of the second transistor, the charging time of said capacitor determining the time during which the trigger brought out of its stable condition by a control pulse remains in its unstable condition with the second transistor conducting, the capacitor being shunted by the collector-emitter path of a third transistor, said third transistor being of the same conductivity type as that of the first and second transistors, the collector of the third transistor being directly connected to the collector of the first transistor and its emitter being directly connected to the base of the second transistor, and the base of the third transistor is connected to a point of constant potential.

2. A monostable trigger circuit comprising, first and second transistors of the same conductivity type, means for biasing said first transistor into its stable state of conduction, means for applying a control pulse to the base of the first transistor for interrupting conduction to provide the unstable state, means for biasing said second transistor to its stable state of non-conduction when said first transistor is in its stable conducting condition, a capacitor connected between the collector of said first transistor and the base of the said second transistor for altering the bias on said second transistor whereby conduction and the unstable state are achieved in the second transistor during the charging time of the capacitor whenever the first transistor changes from its stable to unstable state; and a third transistor of the same conductivity type as said first and second transistors having its collector connected directly to the collector of the first transistor, its emitter connected directly to the base of the second transistor, and its base connected to a source of constant potential, said third transistor providing a low impendance discharge path for the condenser when fully charged.

3. A monostable trigger circuit as set forth in claim 2 in which the base of the third transistor is connected to the source of constant potential through a resistor and the means for biasing the second transistor to the stable state includes a resistor connected between the base of the second transistor and the source of constant potential.

References Cited in the file of this patent

UNITED STATES PATENTS

| | | |
|---|---|---|
| 3,065,362 | Benson | Nov. 20, 1962 |
| 3,093,756 | Rywak | June 11, 1963 |